: 3,361,709
Patented Jan. 2, 1968

3,361,709
POLYOLEFINS STABILIZED WITH A NICKEL COMPLEX OF A BENZOPHENONE
Delos E. Bown and Daniel E. Nicholson, Baytown, Tex., and Robert I. McDougall, Newark, N.J., assignors, by direct and mesne assignments, to Esso Research and Engineering Company, Elizabeth, N.J., a corporation of Delaware
No Drawing. Filed Apr. 4, 1961, Ser. No. 100,526
7 Claims. (Cl. 260—45.75)

The present invention is directed to the stabilizing of polyolefins. More particularly, the invention is concerned with a composition containing a polyolefin which is stable against deterioration. In its more specific aspects, the invention is concerned with a polypropylene composition which has greatly improved stability in sunlight.

The present invention may be briefly described as a compound having the following structural configuration:

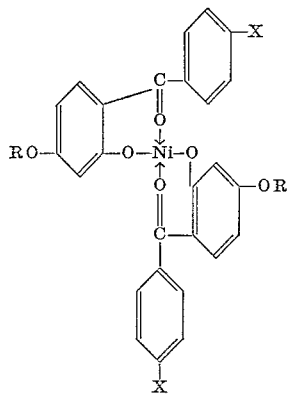

where X is a halogen or hydrogen and R is an alkyl group having 1 to 12 carbon atoms.

The halogen may suitably be chlorine, bromine, iodine, and the like. The alkyl groups may be methyl, ethyl, propyl, butyl, pentyl, hexyl, octyl, or the other alkyl groups of the homologous series having 1 to 12 carbon atoms. Compounds of the nature described are the nickel complexes of substituted benzophenones.

The invention is also concerned with a composition containing the nickel complex of a substituted benzophenone in a minor amount and a major amount of a solid polymer of an alpha olefin having 2 to 8 carbon atoms in the molecule.

The invention is also concerned with a method for stabilizing a solid polymer of an alpha olefin having 2 to 8 carbon atoms in the molecule to which there is added to and homogeneously incorporated in the solid polymer a small but sufficient amount of a nickel complex having the structural configuration as set out hereinabove.

In the practice of the present invention, the nickel complex of substituted benzophenones may suitably be employed in the solid polymer in an amount in the range from about 0.05 to about 1.5 percent by weight of the solid polymer. A preferred amount is in the range from about 0.1 to about 0.5 percent by weight.

In employing the nickel complex of the substituted benzophenones, it may be desirable, and is usually preferred, to employ the nickel complex of substituted benzophenones in conjunction with antioxidants. The antioxidants employed in the practice of the present invention may be used in amounts from about 0.05 to about 1.5 percent by weight and may include by way of illustration and not by way of limitation, oxidation inhibitors such as 2,6-ditertiary-butyl-4-methylphenol; dilaurylthiodipropionate; 2,2′ - methylenebis(4 - methyl-6-tertiary butylphenol); 4,4′-methylenebis(2,6-ditertiary butylphenol); 4,4′ - methylenebis(2 - methyl-6-tertiary butylphenol); $\alpha^2,\alpha^6$ - bis(3 - tertiary-butyl-5-methyl-2-hydroxyphenyl)-mesitol, and mixtures of two or more of the several antioxidants listed herein. It is to be understood that many other antioxidants of similar structural configuration may suitably be employed in the practice of the present invention.

The polyolefin polymers in accordance with the present invention are polymers of olefins having 2 to 8 carbon atoms in the molecule and may suitably be exemplified by polyethylene, polypropylene, ethylene-propylene copolymers, ethylene - butene - 1 copolymers, ethylene-pentene-1 copolymers, and the like, having molecular weights in the range from about 10,000 to about 1,000,000. These polymers are produced by polymerization of the corresponding olefins employing the Ziegler type polymerization catalyst which is obtained by at least partially reducing in solution in a diluent a halide of an amphoteric metal selected from Groups IV–B, V–B, VI–B, and VIII of the Periodic System of Elements (see, for example, the Henry D. Hubbard Periodic Chart of the Elements, 1947 ed., revised by W. F. Meegers; W. M. Welch Mfg. Co., Chicago, Ill.). Examples of suitable halides from which the catalyst is prepared are the halides of titanium, zirconium, hafnium, thorium, uranium, vanadium, columbium, tantalum, chromium, molybdenum, tungsten, and mixtures thereof. Exemplary of suitable compounds include titanium tetrachloride, titanium tetrabromide, zirconium tetrachloride, and the like.

In preparing catalysts suitable for use in forming the polymer treated in accordance with the present invention, an amphoteric metal halide is reduced in solution in a nonreactive, nonpolar organic diluent in any suitable manner, such as by means of chemical reaction with a suitable chemical compound having reducing properties, by irradiation, etc. This is done to reduce at least a portion, and preferably more than about 30 percent, of the amphoteric metal halide to a lower valence state. The product of the reduction step, comprising the diluent and at least partially reduced amphoteric metal halide, is employed as the medium in which olefin polymerization is effected.

The diluent to be employed should be nonreactive, nonpolar organic medium in which the amphoteric metal halide starting material is soluble to an extent at least sufficient to provide an 0.1 weight percent solution of amphoteric metal halide starting material. Thus, for example, in preparing the polymerization medium, an 0.1 to 10 weight percent solution of amphoteric metal halide in the diluent may be employed.

Among the diluents that may be employed are saturated aliphatic hydrocarbons, preferably containing from about 5 to 10 carbon atoms per molecule. Specific examples of such diluents include pentane, hexane, heptane, octane, decane, nonane, and mixtures thereof, or other saturated petroleum hydrocarbons. A particularly desirable diluent is n-heptane. It will be understood that other hydrocarbon diluents may be used, such as aromatic diluents (benzene, xylene, etc.), halogenated aromatic hydrocarbons (monochlorobenzene, dichlorobenzene, etc.) gas oil distillate fractions obtained from the catalytic cracking of virgin gas oil feed stocks, Diesel oil, etc. It will be understood that, if desired, mixtures of two or more compatible, miscible diluents may be employed. The diluent should be substantially completely free from oxygen, water and similar compounds of strong polarity which are reactive with the products obtained by reduction of the amphoteric metal halide.

The nonpolar organic liquid in which the slurry is formed may suitably be identical with the diluent in which the catalyst is formed for polymerizing the olefinic compounds.

The polymerization reaction is suitably conducted at a temperature in the range from about −60° to about 400° F., preferably at about room temperature. Higher temperatures may be employed, but are generally undesirable in that catalytic decomposition may be encountered. Subatmospheric presures and pressures up to about 250 atmospheres may be employed in forming the polymer treated in accordance with the present invention. It is generally preferable to employ in the polymerization technique a comparatively low pressure, and specifically it is desirable to employ atmospheric pressure. Reaction times of about 60 minutes are required, although reaction time may vary within the range of about 10 minutes to about 24 hours.

The olefin polymers of the type described and illustrated herein are produced by a catalyst of the nature described having molecular weights as recited, which are essentially insoluble in the nonpolar organic liquid and form a slurry of polymerized olefins therein. These polymers, after quenching to deactivate any catalyst and after separation from the slurry, are treated by adding to them the nickel complex of the substituted benzophenones of the present invention. The polymer particles are thus stabilized against deterioration by exposure to sunlight and oxygen.

The nickel complex of the substituted benzophenone is suitably prepared by dissolving the substituted benzophenone in ethanol, heating to reflux, and then adding to the resulting solution an equivalent amount of sodium or an excess of sodium acetate solution. Thereafter, anhydrous nickel acetate dissolved in ethanol is added to the solution which results in the precipitation of the nickel complex of the substituted benzophenones. The nickel complex is recovered by filtration and is washed with ethanol, acetone, and water, and then dried. The nickel complex of the substituted benzophenones is obtained in about 75 percent yield.

acetone in water and then dried. There was recovered 10.3 g. (66% yield) of the desired product.

*Example III*

7.8 g. (0.024 mole) of 2-hydroxy-4-octoxybenzophenone was dissolved in 200 ml. of 95% ethanol and then heated to reflux. Then, 40 ml. of 1.2 M sodium acetate was added, followed by 40 ml. of 0.30 M nickel acetate. The mixture was refluxed for 4 days and then cooled to room temperature and filtered. The precipitate was washed with acetone and then water. There was recovered, after drying, 6.0 g. (77% yield) of the desired product.

The nickel complex of the substituted benzophenones is then added to polyolefins, such as polypropylene, in an amount of about 0.05 to about 1.5 percent by weight. On exposing the composition to ultraviolet light, it remains stable over a long period of time.

In employing this nickel complex of substituted benzophenones, it may suitably be added to the polyolefin in a solution of an aromatic hydrocarbon and sprayed over pellets or particles of the polyolefin and the resulting mixture then extruded through a suitable extrusion device to form a homogeneous mixture. The nickel complex may also be added as such to the polymer particles and the resulting mixture milled or extruded to intimately admix the polymer particles with the nickel complex of substituted benzophenones to form a homogeneous mixture.

In order to illustrate the invention further, samples of polypropylene containing 0.2 percent by weight of 2,6-ditertiary-butyl-4-methylphenol and 0.25 percent by weight of the nickel complexes of Examples I, II, and III, respectively, were subjected to outdoor aging tests, outdoor bend tests, and accelerated aging tests in a Fadeometer. These tests are all well known to the art and are specifically described in the ASTM Standards on Plastics. The results of these tests are shown in Table I, and the data show the improved effectiveness of the nickel complex of substituted benzophenones as described hereinabove.

TABLE I.—STABILITY OF SOME STABILIZED POLYPROPYLENE POLYMERS

| Polymer Sample a | Nickel Complex | Wt. Percent | Fadeometer Life, Days b | Percent Retention After Outdoor Aging | | | | Outdoor Bend Test, Days to Fail b |
|---|---|---|---|---|---|---|---|---|
| | | | | 3 Months | | 6 Months | | |
| | | | | Tensile | Elongation | Tensile | Elongation | |
| A | None | | 5 | 97 | 10 | 55 | <10 | 45 |
| A | Example I | 0.25 | 11 | 100 | 100 | 100 | 75 | 99 |
| A | Example II | 0.25 | 40 | 98 | 100 | 100 | 100 | >133 |
| A | Example III | 0.25 | 41 | 97 | 100 | 100 | 100 | >133 | a Commercial polypropylene containing 0.2 wt. percent 2,6-ditertiary-butyl-4-methylphenol.
b Failure either by embrittlement or crazing.

*Example I*

13.7 g. (0.06 mole) of 2-hydroxy-4-methoxybenzophenone was dissolved in 500 ml. of 95% ethanol and then heated to reflux. Then, 100 ml. of 1.2 M sodium acetate was added, followed by 100 ml. of 0.30 M nickel acetate. A light green precipitate began to appear after one hour refluxing. The refluxing was continued for 4 days, after which the mixture was cooled to room temperature, filtered, and then washed with ethanol, acetone, and water and then dried. There was recovered 10.2 g. (75% yield) of the desired product.

*Example II*

15.7 g. (0.06 mole) of 2-hydroxy-4-methoxy-4'-chlorobenzophenone was dissolved in 500 ml. of absolute ethanol and then 1.38 g. (0.06 mole) of sodium was added. After all of the sodium had reacted, the mixture was heated to reflux and 200 ml. of 0.15 M anhydrous nickel acetate in absolute ethanol was added. The mixture was refluxed overnight and then cooled to room temperature. The resulting light green solid was filtered and then washed with The absorption in the ultraviolet region of the spectrum from about 290 to 410 millimicrons is of considerable importance in stabilization of polyolefins, especially in stabilization of clear films and fibers of polyolefins. This is because the polyolefins frequently degrade when exposed to light in the ultraviolet region of the spectrum such as contained in sunlight. The present invention protects polyolefins from such sunlight degradation in that the composition of the present invention absorbs strongly in the ultraviolet region of the spectrum, particularly in the region between 310 and 370 millimicrons where it has been observed that polyolefin degradation is quite constant and; therefore, compounds of the nature described herein which absorb strongly in such region are of considerable importance and utility.

The present invention is quite important and useful in that it provides a stable polyolefin which resists attack by sunlight. This is important and useful because it allows articles to be produced from the polyolefins for outdoor usage. Such articles may include rope, moulded and extruded material such as pipe and the like.

The nature and objects of the present invention having been fully described and illustrated, what we wish to claim as new and useful and secure by Letters Patent is:

1. A composition containing a polymer of an alpha monoolefin having 2 to 8 carbon atoms and a stabilizing amount of the compound:

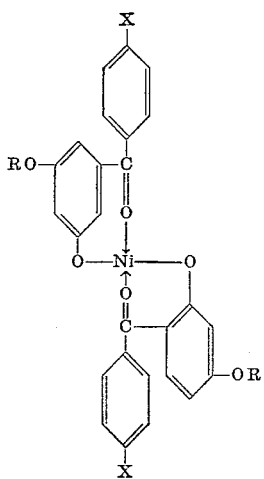

where X is selected from the group consisting of the halogens and hydrogen and R is an alkyl group having 1 to 12 carbon atoms.

2. The composition of claim 1 where R is a methyl group.

3. The composition of claim 1 where R is a methyl group and X is chlorine.

4. The composition of claim 1 where R is an octyl group.

5. The composition of claim 1 in which the polymer is polypropylene.

6. A composition containing a polymer of an alpha monoolefin having 2 to 8 carbon atoms and an amount within the range of 0.05 to about 1.5% by weight of the compound

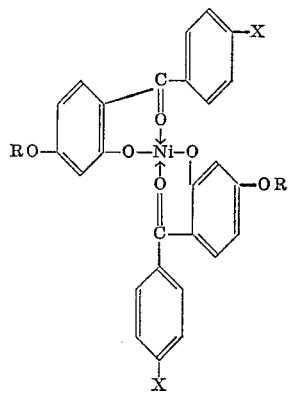

where X is selected from the group consisting of the halogens and hydrogen and R is an alkyl group having 1 to 12 carbon groups.

7. A stabilized polymer composition comprising a solid polymer selected from the group consisting of polyethylene and polypropylene having incorporated therein a stabilizing amount of a reaction product of a nickel salt with 2 hydroxy-4-alkoxybenzophenone.

References Cited
UNITED STATES PATENTS

| | | | |
|---|---|---|---|
| 2,971,941 | 2/1961 | Fuchsman et al. | 260—45.75 |
| 3,006,885 | 10/1961 | Dickson | 260—45.75 |
| 3,006,886 | 10/1961 | Schilling | 260—45.75 |
| 3,098,863 | 7/1963 | Dessauer et al. | 260—45.75 |
| 2,810,753 | 10/1957 | Bersworth | 260—439 |
| 2,974,171 | 3/1961 | Coffield | 260—45.95 |
| 2,976,259 | 3/1961 | Hardy et al. | 260—45.95 |
| 2,985,621 | 5/1961 | Brandes et al. | 260—45.75 |

OTHER REFERENCES

Zetzche, Annalen der Chemie, 445, 1925, pp. 283–296. QD 1 L7.

Martell, Chemistry of Metal Chelate Compounds, 1956, p. 423.

DONALD E. CZAJA, *Primary Examiner.*

LEON J. BERCOVITZ, A. SULLIVAN, *Examiners.*

H. E. TAYLOR, J. H. HALL, *Assistant Examiners.*